United States Patent [19]

Shea

[11] Patent Number: 5,037,009
[45] Date of Patent: Aug. 6, 1991

[54] COMPOSITE FOLLOWER

[75] Inventor: Robert F. Shea, Florissant, Mo.

[73] Assignee: McNeil, St. Paul, Minn.

[21] Appl. No.: 283,503

[22] Filed: Dec. 12, 1988

[51] Int. Cl.$^5$ .............................................. B67D 5/42
[52] U.S. Cl. ...................................... 222/386; 220/93; 222/391
[58] Field of Search ...................... 222/386, 386.5, 391, 222/319, 405; 220/93; 417/550, 555.1, 555.2

[56] References Cited

U.S. PATENT DOCUMENTS

| | | | |
|---|---|---|---|
| 1,723,269 | 8/1929 | Davis | 222/256 |
| 2,388,391 | 11/1945 | Czerner | 222/256 |
| 3,327,906 | 6/1967 | Gormann | 222/389 |
| 3,781,942 | 1/1974 | Coleman | 15/246.5 |
| 3,984,034 | 10/1976 | Cohen | 222/389 |
| 4,471,892 | 9/1984 | Coleman | 222/386.5 |
| 4,684,042 | 8/1987 | Strickler et al. | 222/327 |

FOREIGN PATENT DOCUMENTS 714017 9/1952 United Kingdom .................. 220/93

Primary Examiner—Andres Kashnikow

[57] ABSTRACT

A composite follower for mounting on a pump tube in a drum to facilitate pumping viscous materials from the drum through the tube. The composite follower includes a generally circular follower body having an outer peripheral edge adapted for slidably but sealingly engaging the walls of the drum. The body further includes a socket generally through the center of the body. The composite follower has an annular insert installed in the socket of the follower body. The insert has a central bore adapted to receive the pump tube through it for enabling the follower to slide axially on the tube with the insert in sealing engagement with the tube. There are fasteners for securing the insert in the socket and a sealing cap for sealing the joint at the intersection of the insert with the follower body.

4 Claims, 3 Drawing Sheets

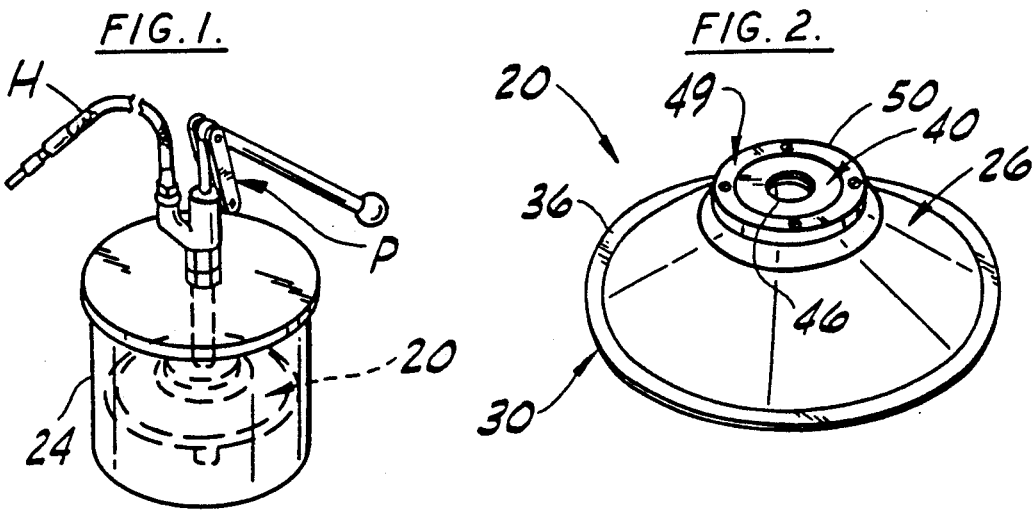
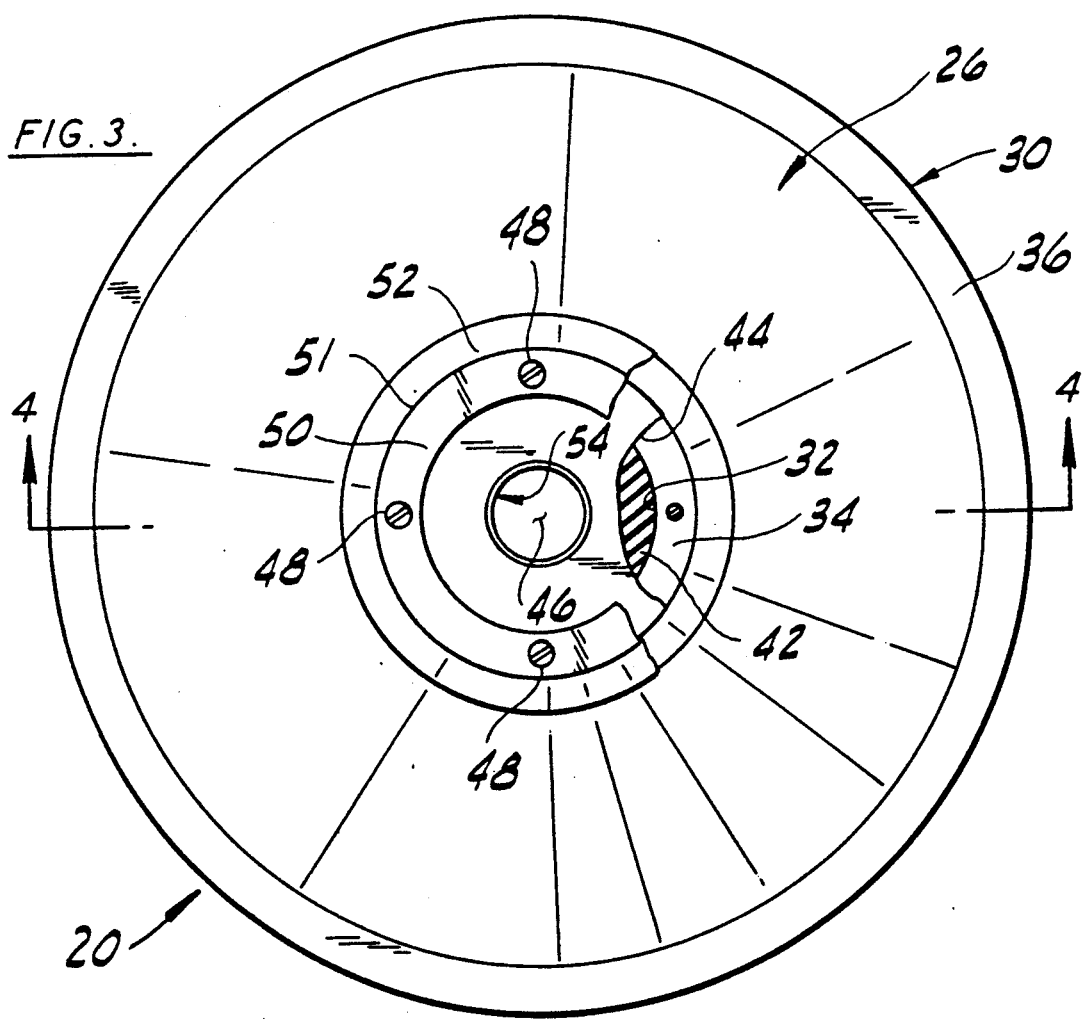

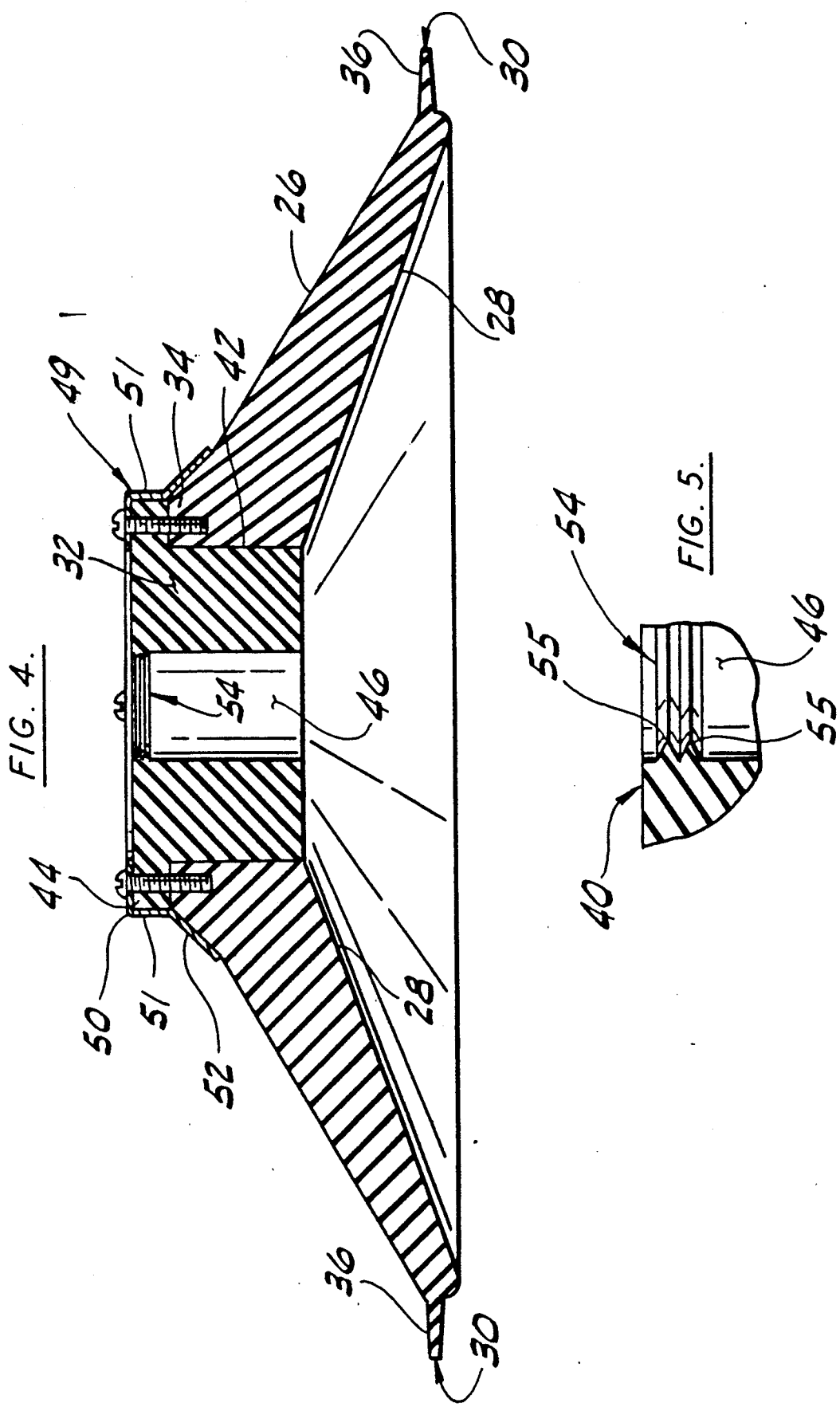

5,037,009

COMPOSITE FOLLOWER

BACKGROUND OF THE INVENTION

This invention relates to pump followers of the type used in apparatus for dispensing viscous material from a drum.

A pump follower is a generally circular plate that is slidably mounted on a pump tube in a drum or bucket to facilitate pumping viscous materials from the drum or bucket. The follower is disposed above the viscous material and is adapted to sealingly engage the pump tube and the walls of the drum or bucket to maintain a pressure difference on opposing surfaces of the follower.

Followers are needed in a wide variety of sizes to accommodate different sizes of drums and buckets and to accommodate different sizes of pump tubes. Thus manufacturers must be prepared to manufacture a wide range of followers. The cost of tooling up and manufacturing these many different followers can be quite high. This is compounded by the costs of stocking those followers. Similarly, users of viscous materials must maintain a collection of followers for many sizes of pump tubes and drums encountered. This is not only expensive, but results in storage problems when the followers are not in use.

SUMMARY OF THE INVENTION

Among the several objects of the present invention includes the provision of a follower of composite construction that can be assembled from stock or standard pieces; the provision of a simple and inexpensive method of manufacturing pump followers by manufacturing and assembling standardized or stock pieces; the provision of a standard pump follower body adapted to receive inserts with different sizes of bores to form a pump follower for differing sizes of pump tubes; and the provision of a kit from which a desired pump follower can be assembled from stock parts.

The composite pump follower of this invention is adapted to be mounted on a pump tube in a drum to facilitate pumping viscous materials from the drum through the tube. Generally the follower comprises a generally circular follower body having an outer peripheral edge adapted for slidably but sealingly engaging the walls of the drum. A socket extends generally through the center of the body. The composite follower also includes an annular insert installed in the socket of the follower body. The insert has central bore adapted for receiving the pump tube therethrough for enabling the follower to slide axially on the pump tube with the insert in sealing engagement with the tube. The follower further comprises means for securing the insert in the socket and means for establishing a seal between the insert and the follower body. The composite follower, configured with an interchangeable insert removes the necessity of large inventories of followers to provide followers adapted to pump tubes of different diameters.

The universal pump follower body of this invention is adapted to be assembled with any of a plurality of annular inserts having central bores of different sizes for receiving pump tubes of different sizes. The universal pump follower body is of one-piece molded construction and has a generally frustoconical shape with a concave bottom surface. The body has a relatively thicker central section and tapers in thickness toward a flexible peripheral edge. The body is thus stiffer in the center and more flexible at the edges. There is an opening through the thick central section, the sides of which define a socket for receiving one of the inserts.

The method of this invention involves manufacturing a composite follower from a molded universal pump follower body and any of a plurality of annular inserts having different sized bores for receiving different sized pump tubes, to form a pump follower for mounting on a selected pump tube. The method generally comprises the step of molding a universal pump follower body, having a central socket, from a flexible material. The method further comprises selecting one of a plurality of annular inserts having similar external configurations adapted to be received in the socket in the follower body and having a bore of appropriate size to slide axially on the selected pump tube in sealing engagement with the tube. The selected insert is installed in the socket of the follower body and secured to the body with securing means, thereby forming a pump follower from the pump follower body that is adapted for sliding but sealing engagement with the selected pump tube.

The universal pump follower kit of the present invention is adapted for assembling a pump follower to fit a particular pump tube. The kit includes a generally circular follower body having a socket generally through the center of the body. The kit includes a plurality of annular inserts, each having a similar external configuration adapted to fit in the socket in the universal pump follower body. Each insert has a bore of a different, predetermined diameter to accommodate a pump tube of corresponding diameter. The kit further includes means for securing a selected insert in the socket and means for establishing a seal between the insert and the follower body, to form a complete pump follower that can slide on a selected pump tube in sealing engagement therewith.

The composite follower of this invention thus provides a simple to manufacture follower that can be assembled from stock parts. The method of this invention provides a simplified manufacture of pump followers that eliminates the need to make tooling to manufacture each of the many possible combinations of followers to accommodate the different sizes of drums and pump tubes. The method provides for assembly of followers from stock pieces, reducing tooling and manufacturing cost. The universal pump follower body of the present invention provides a single follower body for a particular sized drum that can be adapted with a plurality of inserts to fit any of the pump tubes that might be used in the drum. The kit of the present invention eliminates the need of users to purchase, maintain and store, a number of followers for each drum size. The kit allows the assembly of a follower from a small number of standardized parts.

Other objects and features will be in part apparent and in part pointed out hereinafter.

BRIEF DESCRIPTION OF THE DRAWINGS

FIG. 1 is a perspective view of a first embodiment of a composite follower constructed according to the principles of this invention shown as it would be mounted on a pump tube disposed in a bucket;

FIG. 2 is a perspective view of the composite follower;

FIG. 3 is a top plan view of the composite follower with a portion of the annular insert cut away to illustrate details;

FIG. 4 is a horizontal cross-section of the composite follower taken along the plane of the line 4—4 in FIG. 3;

FIG. 5 is an enlarged partial view of the insert showing the sealing lip; and

Corresponding reference characters indicate corresponding parts throughout the several views of the drawings.

DETAILED DESCRIPTION OF THE PREFERRED EMBODIMENT

Figure 6:
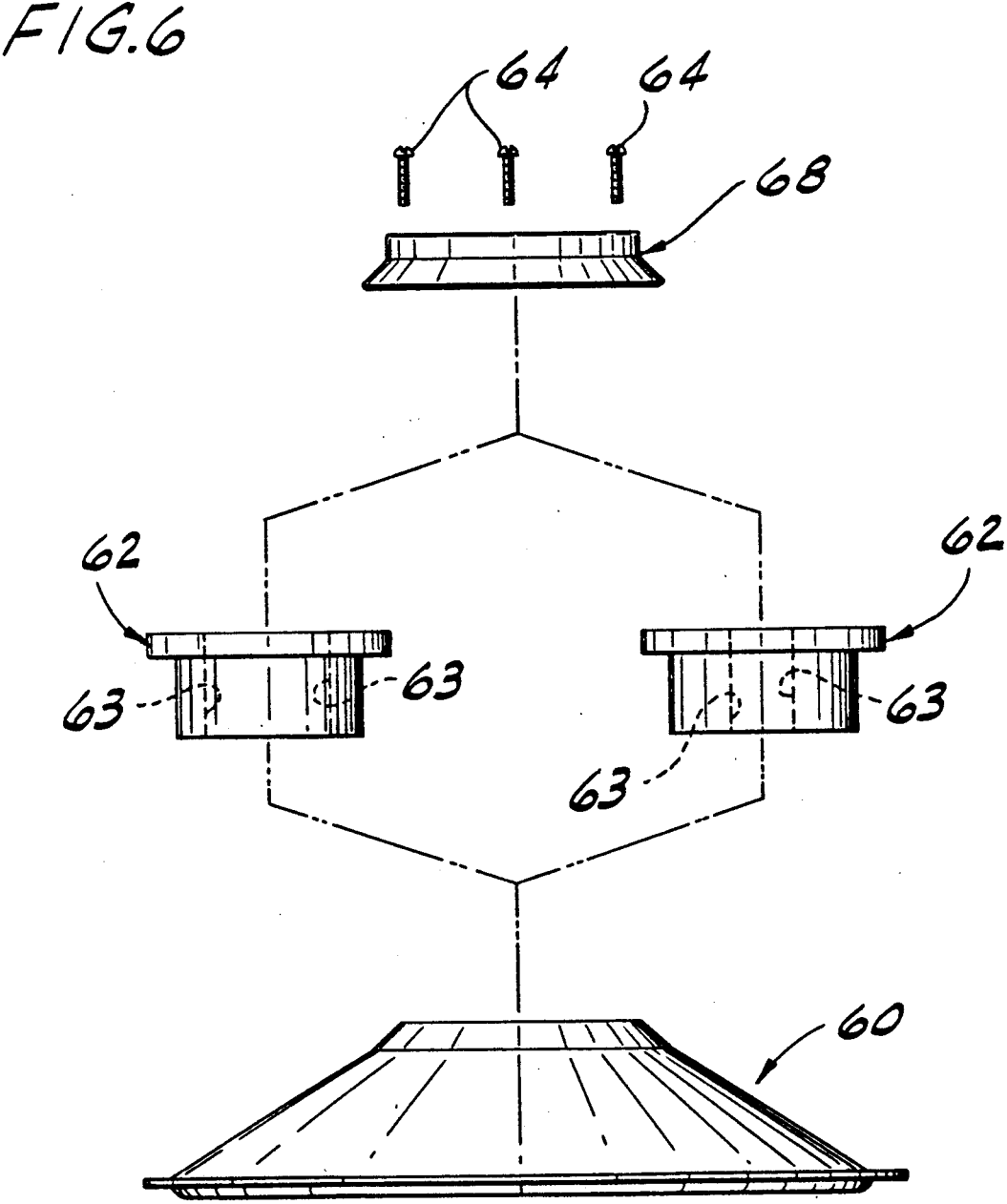
FIG. 6 is a side view of a follower kit.

A composite follower constructed according to the principles of this invention, indicated generally as 20, is shown in FIG. 1 as it would be mounted on a pump tube T in a drum 24 to facilitate the pumping of viscous material from the drum 24 through a pump tube T and out of the drum 24 through a hose H. The composite follower comprises a follower body generally indicated at 26 shaped like the frustum of a cone, and having a concave bottom 28. The follower body 26 has an outer peripheral edge indicated generally at 30 adapted for slidably but sealingly engaging the walls of the drum 24. A central socket 32 extends through the follower body 26, and a flat upper surface 34 on the top of the body 26 surrounds the socket. As shown in FIG. 4, the body 26 is thickest in cross section adjacent the socket 32, and gradually decreases in thickness in a radially outward direction.

The peripheral edge 30 preferably includes a flexible rim 36 that can resiliently radially deform. This allows the lip to maintain sealing contact with the walls of the drum, for example as the drum diameter varies. The flexible rim 36 allows the follower to be used in drums which are tapered or in which the walls have been dented. Additionally, the flexible rim 36 allows the follower to be used in drums that are slightly different from the nominal size of the follower.

The composite follower 20 further comprises an annular insert 40 comprising a shank portion 42 that is adapted to fit in the socket of the body, a radially projecting flange 44 at the top of the shank and a central bore 46 extending generally through the center of the insert. The annular insert 40 is manufactured separately from the follower body 26 and is installed in the socket 32 of the follower body 26. When the insert is installed in the socket, the flange 44 overlies the flat upper surface 34 of the follower body 26. The insert 40 is secured to the follower body 26 by releasable securing means, for example a plurality of threaded fasteners 48 extending through holes in flange 44 and into the follower body 26.

The composite follower 20 also includes means for establishing a seal at the joint between the follower body 26 and the flange 44 of the insert 40, which is formed between the flange 44 and the flat upper surface 34. The sealing means preferably comprises a sealing cap 49 adapted to be secured over the insert 40 and a portion of the follower body 26 immediately surrounding the radially outer edge of the flat upper surface 34. The cap 49 has an annular upper wall 50 which overlies the flange 44. The upper wall 50 has holes in it which are aligned with the holes in the flange 44, so that the cap 49 can be secured to the follower body 26 with fasteners 48. The sealing cap also includes a skirt having a cylindric side wall 51 projecting downwardly, at right angles to the upper wall 50, and a lower portion 52 flaring downwardly and radially outwardly from the lower edge of the side portion 51. The inner surface of the sealing cap 49 closely conforms to the contour of the flange 44 and the follower body 26. The fasteners 48 tightly seat the sealing cap 49 against the joint between the flange 44 and the flat upper surface 34 of the follower body 26, thereby covering and sealing the joint. The tightly seated sealing cap 49 also forces the flange 44 against the flat upper surface 34 of the follower body 26, further enhancing the seal at that joint. The sealing cap 49, in combination with the peripheral edge 31 of the follower body 26 operate to maintain a vacuum pressure in the drum 24 below the composite follower 20. The vacuum pressure increases the operational efficiency of the pump P.

The bore 46 in insert 40 is adapted to receive the pump tube T. A lip 54, comprising a plurality (two in the preferred embodiment) of V-shaped ridges 55 extending around the entire circumference of the bore 46, projects radially inwardly into the bore 46. The diameter of the pump tube T is larger than the diameter of the space defined by the ridges 55 so that the ridges are compressed by the tube T, and form a seal with the tube. Although sealingly engaged on the tube T, the follower 20 can still slide down on the tube T as the material in the drum 24 beneath the tube T is with displaced by the bucket pump P.

In another aspect, the invention comprises a universal pump follower body 26 that is adapted to be assembled with any of a plurality of annular inserts 40. The inserts are generally similar except they have central bores of different sizes for receiving pump tubes of different sizes.

According to the method of manufacturing pump followers of this invention, the follower is made from a molded universal pump follower body and any of a plurality of annular inserts. A universal pump follower body 26, described above, is molded from a flexible material, preferably synthetic rubber. One of a plurality of annular inserts 40, also described above, is selected according to the bore size so that the assembled follower will slidingly sealingly engage a particular size pump tube. The insert 40 is also preferably made of synthetic rubber. The selected insert 40 is installed into the socket 32 of the follower body 26, by inserting the shank 42 into the socket 32. The joint between the insert 40 and the follower body 26 is then sealed. This is preferably done by placing a sealing cap 49, over the joint. The sealing cap 49 and the insert 40 are secured to the body 26 by the fasteners 48. The follower 20 thereby formed is adapted for sliding but sealing engagement with the selected pump tube T.

In another aspect of the invention, a universal pump follower is provided in kit form (See FIG. 6). The kit comprises at least one generally circular universal follower body 60, described above. The kit also includes a plurality of annular inserts 62, each with a bore 63 having a different predetermined diameter to accommodate a pump tube of different diameter. The kit further includes means 64 for releasably securing a selected insert 62 in the socket in the body 60 and means 68 for establishing a seal between the insert and the follower body. The kit allows the user to form a pump follower adapted to fit the particular pump tube. A follower kit adapted for assembling a follower which will fit on all of the standard pump tube sizes assures the user of having the follower he requires. A further advantage is that the follower body may be converted to fit pump tubes of other sizes by replacing the insert. This is accomplished by reversing the steps of the assembly method described above, and assembling a follower of different configuration using a different insert and the same assembly steps.

The composite follower of this invention reduces the required inventory of relatively large followers which must be maintained by the manufacturer and supplier of follower and replaces them with a lesser number of standard follower bodies and relatively smaller inserts. Further, the inserts are not limited to adapting to a follower body of one size and therefore the overall tooling required for the manufacturer is reduced. The follower body of this invention not only adapts to pump tubes of different sizes, as described, but provides a flexible rim for adapting to the walls of a drum through variations in the drum diameter. The body further provides a concave surface on its bottom for forcing material radially inwardly toward the pump tube reducing the wasted material in the drum, as compared with flat bottomed followers, after the pump has evacuated material in the drum to the point of losing prime. The method of this invention allows the follower of this invention to be converted from a configuration for one pump tube to another configuration for a second pump tube, thus reducing the number of followers necessary for any user having bucket pumps with various pump tube sizes. The provision of a follower kit of this invention generally assures that the purchaser of buying a follower which will slidingly and sealingly engage the particular pump tube being used by the purchaser, because the kit includes inserts adapted for sealing engagement with all standard pump tubes sizes used in a drum of a given size.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A composite pump follower for mounting on a pump tube in a drum to facilitate pumping viscous materials from the drum through the tube, the follower comprising:
    a generally frustoconical universal follower body having an outer peripheral edge adapted for slidably but sealingly engaging the walls of the drum, a socket generally through the center of the follower body and a flat surface on the top side of the follower body surrounding the socket;
    an annular insert installed in the socket of the follower body, the insert having a central bore adapted for receiving the pump tube therethrough for enabling the follower to slide axially on the pump tube with the insert in sealing engagement therewith and a flange projecting from the periphery of the insert and overlying the flat surface on the top side of the follower body;
    a plurality of threaded fasteners extending through the flange on the insert and into the follower body for securing the insert in the socket; and
    means for establishing a seal between the insert and the follower body, said sealing means comprising a sealing cap adapted to be secured over the insert and the follower body to cover the joint between the flange and the follower body.

2. The composite pump follower according to claim 1 sealing the cap comprises an upper annular wall overlying the flange, and a skirt depending from said upper wall and covering the joint, the skirt comprising a cylindric side wall projecting downwardly from the upper wall at right angles thereto, and a lower portion flaring downwardly and radially outwardly from the side wall, the upper wall having holes therein adapted to receive the threaded fasteners therethrough for securing the cap to the composite pump follower and tightly seating the sealing cap against the joint to seal the joint.

3. A composite pump follower for mounting on a pump tube in a drum to facilitate pumping viscous materials from the drum through the tube, the follower comprising:
    a generally circular universal follower body having an outer peripheral edge adapted for slidably but sealingly engaging the walls of the drum, and a socket generally through the center of t he follower body;
    an annular insert installed in the socket of the follower body, the insert having a central bore adapted for receiving the pump tube therethrough for enabling the follower to slide axially on the pump tube with the insert in sealing engagement therewith, and a flange for engaging the follower body around the socket;
    means for securing the insert in the socket; and
    a sealing cap adapted to be secured over portions of the insert and the follower body to cover the joint between the flange and the follower body for establishing a seal between the insert and the follower body.

4. A universal pump follower kit for assembling a pump follower of the type for mounting on a pump tube in a drum to facilitate pumping viscous materials from the drum through the tube, the kit comprising:
    a generally circular universal follower body having a socket generally through the center of the body;
    a plurality of annular inserts, each having a similar external configuration adapted to fit in the socket in the universal pump follower body and a bore therethrough having one of a range of predetermined diameters to accommodate a pump tube of corresponding diameter, each insert being adapted to be secured in the socket of the follower body and adapted to receive a pump tube therethrough for enabling the pump follower to slide axially on the tube with the insert in sealing engagement with the tube;
    means for releasably securing a selected insert in the socket; and
    means for establishing a seal between the insert and the follower body, said sealing means comprising a sealing cap adapted to cover the joint between the flange and the follower body.

* * * * *